March 8, 1966     C. O. CHRISTENSEN     3,238,548
SELF-LOCKING RAMP

Filed June 17, 1963

INVENTOR
CARL O. CHRISTENSEN
BY
Mellin and Hauscom
ATTORNEYS

United States Patent Office 3,238,548
Patented Mar. 8, 1966

3,238,548
SELF-LOCKING RAMP
Carl O. Christensen, Alamo, Calif., assignor to Roll-Rite Corporation, Oakland, Calif., a corporation of California
Filed June 17, 1963, Ser. No. 288,122
1 Claim. (Cl. 14—72)

This invention relates to bridging ramps and more particularly to a bridging ramp that may be locked in position although the effective bridging distance between platforms may vary to some degree.

In brief, this invention involves a bridging ramp which is self-locking between two platforms, and comprising a plurality of pivoted arms having contact surfaces engageable with a common vertical abutment of one platform for different and various bridging distances between platforms.

One primary object of this invention is to provide apparatus in combination with a bridging ramp that will automatically lock the ramp between two platforms over a range of bridging distances.

A second object is to provide a bridging ramp that is itself self-locking between two platforms over a range of bridging distances.

Another object is to provide a bridging ramp of the kind described which may be positioned and self-locked by sliding the ramp from a fixed platform to a platform which has been randomly positioned within a fixed range of distances.

Another object is to provide a bridging ramp of the kind described including a plurality of locking arms pivoted within a common housing that limits or restricts the movement of each arm, and wherein said arms and housing as a unit may be selectively mounted to the side of the ramp to cover a specified range of spacing distances between two platforms.

It is another object of this invention to provide a bridging ramp of the kind described including a plurality of pivoted arms, each arm being formed with a downward tapering tooth that will contact an abutment over a range of distances.

A further object is to provide a self-locking bridging ramp that may be positioned and locked between two platforms, or removed from such a position, entirely without manual aid and by means of a forklift truck.

Other objects of this invention will become apparent in view of the following detailed description and accompanying drawings.

Figure 1:
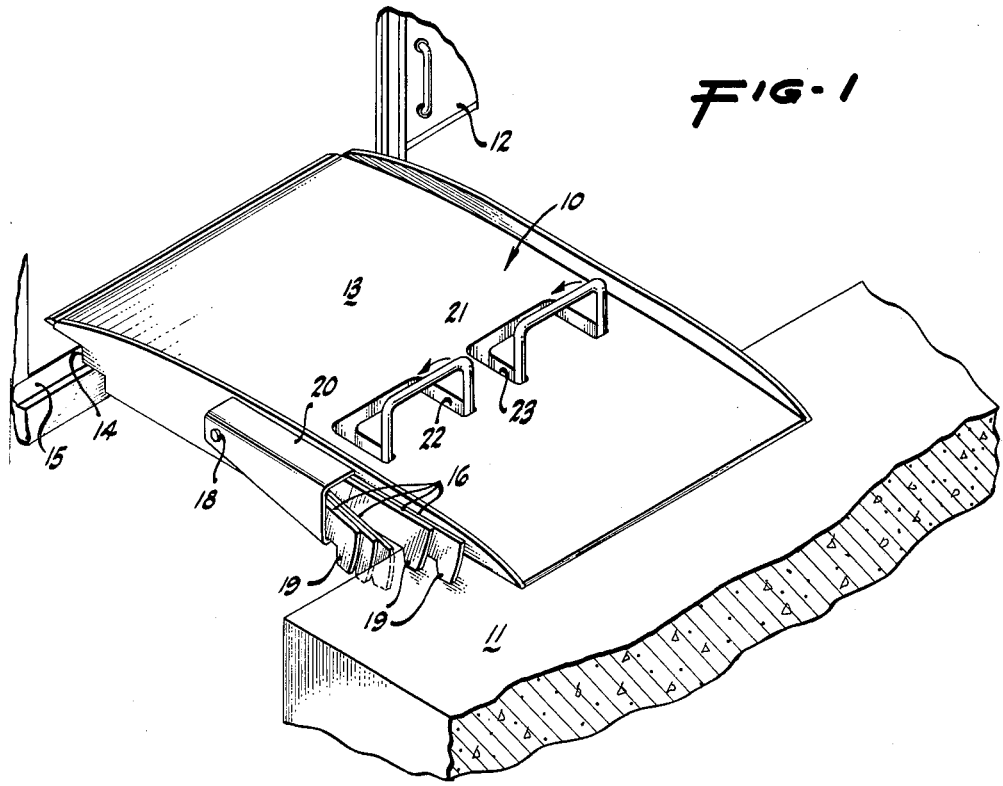
Figure 2:
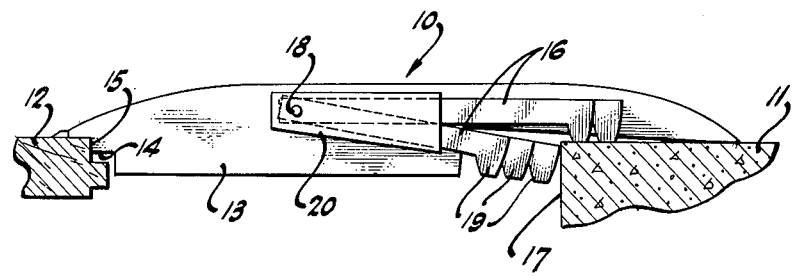

In the drawings forming a part of this application and in which like parts are identified by like reference numerals throughout the same, FIG. 1 is an isometric view illustrating a preferred embodiment for a bridging ramp construction; and FIG. 2 is a side elevation of the bridging ramp as shown in FIG. 1.

Referring to the drawings, FIG. 1 illustrates a preferred embodiment of bridging ramp 10, supported at one end upon a fixed platform 11 and at the other end by the bed or platform of a vehicle body 12. Bridging ramp 10 comprises a body portion 13 formed with a stepped under surface 14 that engages a shoulder 15 of platform 12. The surface engagement between ramp 10 and shoulder 15 limits movement of the ramp in the direction toward platform 12, but does not prevent or limit either vertical lifting of ramp 10 or movement thereof in the direction toward platform 11.

This invention is more particularly directed to that ramp structure and a combination of apparatus which limits movement of the ramp, especially in the direction toward platform 11, for various bridging distances between platforms 11 and 12. For this purpose, there is provided a plurality of arms 16 which are mounted to ramp 10 and provide contact surfaces engageable with a common vertical abutment 17 of platform 12. Each arm is pivoted from one end upon a common pivot shaft 18, the other end being formed with a downward tapering tooth 19 that is adapted to make surface contact with abutment 17 for a limited range of spacing distances between platforms 11 and 12. In addition, a housing 20 is provided for arm 16, said housing having upper and lower surfaces which limit or restrict the pivotal movement of each arm. The assembly of housing 20 and arm 16 may be mounted to the side of ramp body 13 as a unit to cover a given range of distances between platforms 11 and 12 with an average selected distance of intended use. Thus, the same unitary assembly of arms 16 and housing 20 may be used with various lengths of ramps, or the assembly may be located on ramps of identical length as to accommodate an essentially different range of platform spacing.

It will be noted that ramp 10 is further provided with a pair of U-shaped brackets 21. These brackets may be respectively engaged by the forks of a forklift truck, which may be used either for setting the ramp in place or removing the same from a bridging position. Each bracket 21 is pivoted upon a common horizontal axis below the upper supporting surface of the ramp, and the brackets may be pivoted into vertical positions, as shown, from positions within U-shaped recesses 22 and 23, respectively.

In operation, ramp 10 may be placed in bridging relationship to platforms 11 and 12 entirely by means of a forklift truck. Moreover, since the ramp 10 possesses a self-locking character, no manual effort is required. The ramp may be located in bridging relationship by either sliding the ramp from platform 11 toward platform 12, or it may be positioned entirely by vertical placement.

It will be apparent that as ramp 10 is either lowered into position or moved along platform 11 toward platform 12, teeth 19 drop off of platform 11 and behind the abutment 17. The tooth closest to abutment 17 will, of course, determine the limit to which ramp 10 can be moved in the direction of ramp 11, and when the step surface 14 of ramp 10 engages shoulder 15 of platform 12, the ramp becomes locked in a spanning relationship to platforms 11 and 12.

Although a preferred embodiment of this invention has been described, various changes may be made without departing from the spirit of the invention or the scope of the attached claim, and each of such changes is contemplated.

What I claim and desire to secure by Letters Patent is:

In combination, a ramp bridging between two platforms, said ramp having a stepped under surface at one end engageable with the edge of one platform while the other end of said ramp is being supported upon the second platform, a housing mounted on one side of said ramp, said housing having upper and lower surfaces and being open towards the end of the ramp that is supported on said second platform, a plurality of arms each pivoted at one end to the housing for pivotal movement about a common horizontal axis extending transversely of said ramp, said arms each being of a different length and extending from the open end of said housing, the pivotal movement of said arms being limited by engagement of said arms with the upper and lower surfaces of said housing, said arms each having a downward tapered tooth on the free end thereof adapted to extend below the under surface of said ramp when the arms pivot downwardly into engagement with the lower surface of said housing.

References Cited by the Examiner
UNITED STATES PATENTS

| | | | |
|---|---|---|---|
| 686,490 | 11/1901 | Uphoff | 14—72 |
| 2,337,138 | 12/1943 | Van Berg | 14—72 |
| 2,452,222 | 10/1948 | Bryson | 14—72 |
| 2,452,289 | 10/1948 | Bryson | 14—72 |
| 2,461,678 | 2/1949 | Christensen | 14—72 |
| 2,521,349 | 9/1950 | Diamond | 14—72 |
| 2,659,914 | 11/1953 | Law | 14—72 |

CHARLES E. O'CONNELL, *Primary Examiner.*

JACOB L. NACKENOFF, *Examiner.*

N. C. BYERS, *Assistant Examiner.*